UNITED STATES PATENT OFFICE.

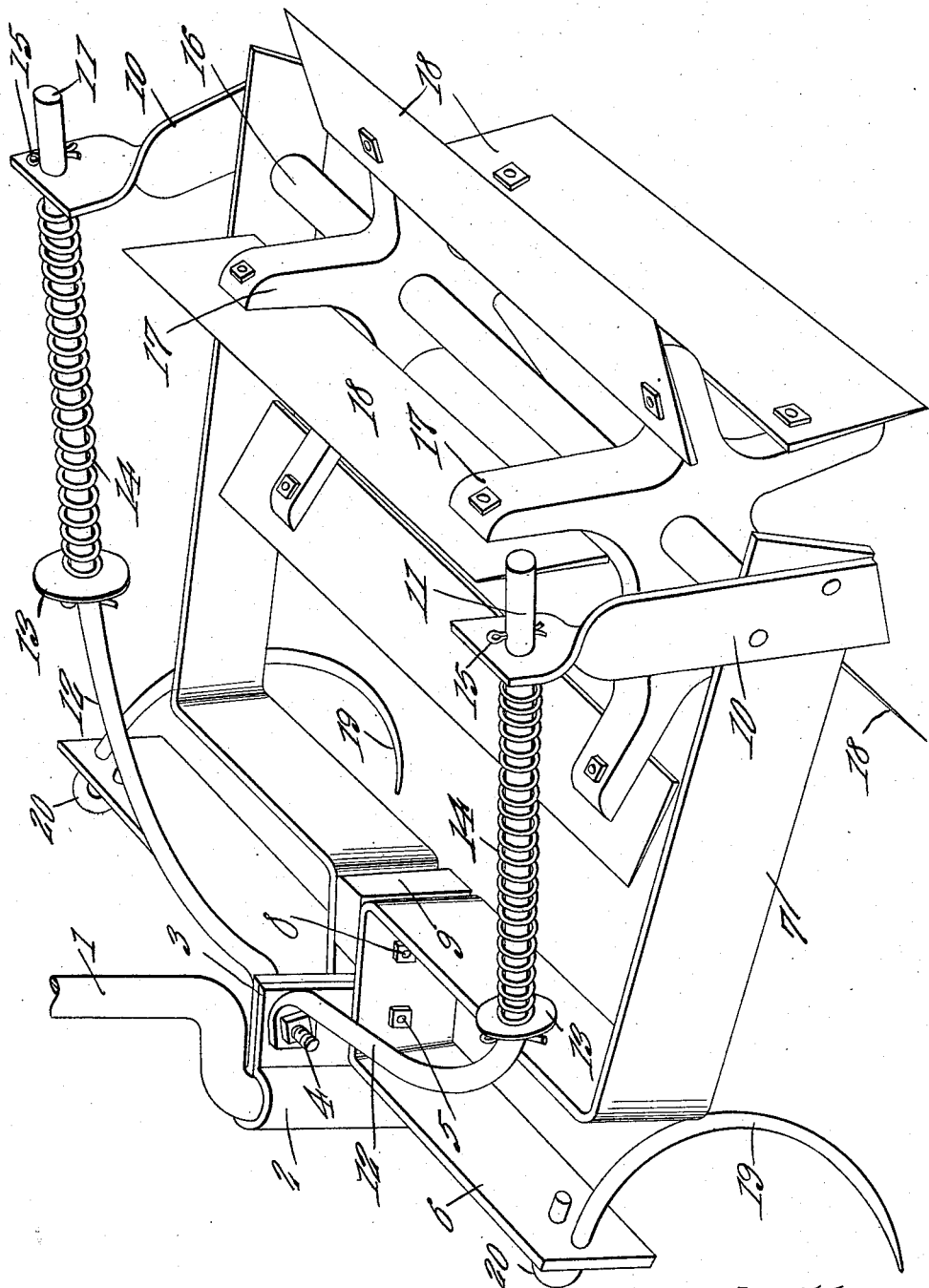

DON A. MODRALL, OF SWEETWATER, TEXAS.

STALK-CUTTER.

1,169,988.  Specification of Letters Patent.  Patented Feb. 1, 1916.

Application filed September 11, 1915. Serial No. 50,127.

*To all whom it may concern:*

Be it known that I, DON A. MODRALL, a citizen of the United States, residing at Sweetwater, in the county of Nolan and State of Texas, have invented a new and useful Stalk-Cutter, of which the following is a specification.

This invention relates to a stalk cutting attachment for plows, one of the objects of the invention being to provide a simple, durable and compact device of this character which can be attached readily to the beam of a plow and which will operate efficiently to cut the stalks in the path of the plow so that they can be readily turned into the ground.

A further object is to provide simple and efficient means for exerting a constant yielding pressing of the cutting blades against the ground.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawing, which is a perspective view of the attachment, the preferred form of the invention has been shown.

Referring to the drawing by characters of reference 1 designates a standard adapted to be secured in any manner desired to the beam of a plow or to any other suitable structure and mounted upon the lower portion of this standard is a clip 2 having a rearwardly extending wing 3 through which extend upper and lower pivot bolts 4 and 5. Mounted on the pivot bolt 5 at opposite sides of the wing 3 are U-shaped members 6 each of which is provided at its outer end with a rearwardly extending arm 7. The members 6 are oppositely disposed and are secured together in any desired manner as by means of a bolt 8 located back of the wing 3 and extending through a spacing block 9. Thus it will be seen that the two members 6 and their arms 7 will move as one body about the pivot 5.

Extending upwardly from the rear portion of each arm 7 is a guide finger 10 and slidably mounted within each of these fingers is a rod 11 provided, at its forward end, with an inwardly curved portion 12 pivotally mounted on the bolt 4. Each rod 11 has a collar 13 and mounted on each rod is a spring 14 one end of which bears against the collar, while the other end bears against the finger 10. A stop pin 15 extends through the rear portion of each rod 11 and serves to hold the rod against withdrawal from the finger 10 in which it is mounted.

Journaled within the rear portions of the arms 7 is a transverse shaft 16 and secured to this shaft adjacent the arms 7 are spiders 17 to which are fastened cutting blades 18 preferably parallel with the shaft 16.

Extending rearwardly from the outer end of the forward portion of each member 6 is a curved gathering finger 19 preferably made of heavy wire, this finger extending through the member 6 and having a backwardly bent portion 20 projecting through said member so as to hold the finger against rotation relative to the member.

It is to be understood that the springs 14 by thrusting against the fingers 10 serve to press said fingers rearwardly and thus thrust downwardly upon the arms 7 with the result that the lowermost blade 18 will press yieldingly upon the surface of the ground. As the attachment is drawn forward, the fingers 17 will draw taut inwardly so as to be brought into the path of the cutting blades and the blades 18 in traveling over the stalks will not only cut through them but will also cause the shafts 16 to rotate, thus bringing the blades successively into active positions. The springs 14 will yield sufficiently to allow the cutting blades to pass over unyieldable obstructions and to follow any irregularities in the contour of the surface of the ground.

Although the cutter carrying frame is preferably made up of the opposed U-shaped members and the arms 7 as shown and described, it is to be understood that this frame can be of any other desired structure preferred.

What is claimed is:—

A stalk cutting attachment including a standard, a clip secured thereto and having a rearwardly extending wing, a frame pivotally connected to the wing and having rearwardly extending arms, a revoluble series of cutters carried by the frame, fingers upstanding from the arms, rods pivotally connected to the wing and above the frame and slidably mounted in the fingers, springs on the rods and bearing against the fingers to exert a constant rearward pressure thereagainst, thereby to hold the cutting elements pressed yieldingly against the surface of the ground, and stalk gathering devices connected to the front portion of the frame at the sides thereof.

In testimony that I claim the foregoing as my own, I have hereto affixed my signature in the presence of two witnesses.

DON A. MCDRALL.

Witnesses:
C. A. CLAYTON,
SILAS GEORGE.